United States Patent
Kashani

(10) Patent No.: US 10,208,823 B2
(45) Date of Patent: Feb. 19, 2019

(54) VARIABLE RATE BOUND STOPPERS AND VARIABLE RATE SUSPENSION SYSTEMS CONTAINING VARIABLE RATE BOUND STOPPERS

(71) Applicant: Toyota Motor Engineering & Manufacturing North America, Inc., Erlanger, KY (US)

(72) Inventor: Aria Kashani, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 42 days.

(21) Appl. No.: 15/412,968

(22) Filed: Jan. 23, 2017

(65) Prior Publication Data

US 2018/0195572 A1    Jul. 12, 2018

Related U.S. Application Data

(60) Provisional application No. 62/444,589, filed on Jan. 10, 2017.

(51) Int. Cl.
| | | |
|---|---|---|
| *F16F 1/36* | (2006.01) | |
| *B60G 11/54* | (2006.01) | |
| *B60G 17/015* | (2006.01) | |
| *B60G 17/02* | (2006.01) | |

(52) U.S. Cl.
CPC ............ *F16F 1/3615* (2013.01); *B60G 11/54* (2013.01); *B60G 17/0157* (2013.01); *B60G 17/02* (2013.01); *B60G 2202/143* (2013.01); *B60G 2202/312* (2013.01); *B60G 2204/4502* (2013.01); *B60G 2204/62* (2013.01); *B60G 2206/70* (2013.01); *B60G 2206/73* (2013.01); *B60G 2500/22* (2013.01); *B60G 2800/94* (2013.01); *F16F 2224/0258* (2013.01); *F16F 2228/066* (2013.01)

(58) Field of Classification Search
CPC ........ B60G 11/24; B60G 11/22; B60G 15/06; B60G 2202/32; B60G 2206/42; B60G 2206/70; B60G 2500/22; B60G 2800/162; B60G 2800/94; F16F 1/3615; F16F 2224/0258; F16F 2228/066
See application file for complete search history.

(56) References Cited

U.S. PATENT DOCUMENTS

| | | | | |
|---|---|---|---|---|
| 3,118,659 | A | * | 1/1964 | Paulsen .................... B60G 7/04 267/140.4 |
| 6,174,008 | B1 | | 1/2001 | Kramer et al. |
| 6,491,291 | B1 | | 12/2002 | Keeney et al. |
| 8,261,892 | B2 | | 9/2012 | Browne et al. |
| 8,313,108 | B2 | | 11/2012 | Ac et al. |

(Continued)

*Primary Examiner* — Melanie Torres Williams
(74) *Attorney, Agent, or Firm* — Dinsmore & Shohl LLP

(57) ABSTRACT

A variable rate bound stopper includes a bound stopper in the form of an elastomer member. The elastomer member has an aperture such that the bound stopper is configured to be positioned over and disposed around a piston rod of a shock absorber. A shape memory alloy (SMA) coil formed from an SMA wire extends around at least a portion of the elastomer member. The SMA coil has a relaxed state and an activated state. The SMA coil constrains the elastomer member from deforming radially outward and alters an intrinsic spring rate of the bound stopper when in the activated state.

20 Claims, 8 Drawing Sheets

(56) References Cited

U.S. PATENT DOCUMENTS

| | | |
|---|---|---|
| 9,004,242 B2 | 4/2015 | Hodgson |
| 9,545,829 B2 * | 1/2017 | Al-Dahhan ............... F16F 9/58 |
| 2005/0263359 A1 * | 12/2005 | Mankame ........... E05B 47/0009 |
| | | 188/266.1 |

* cited by examiner

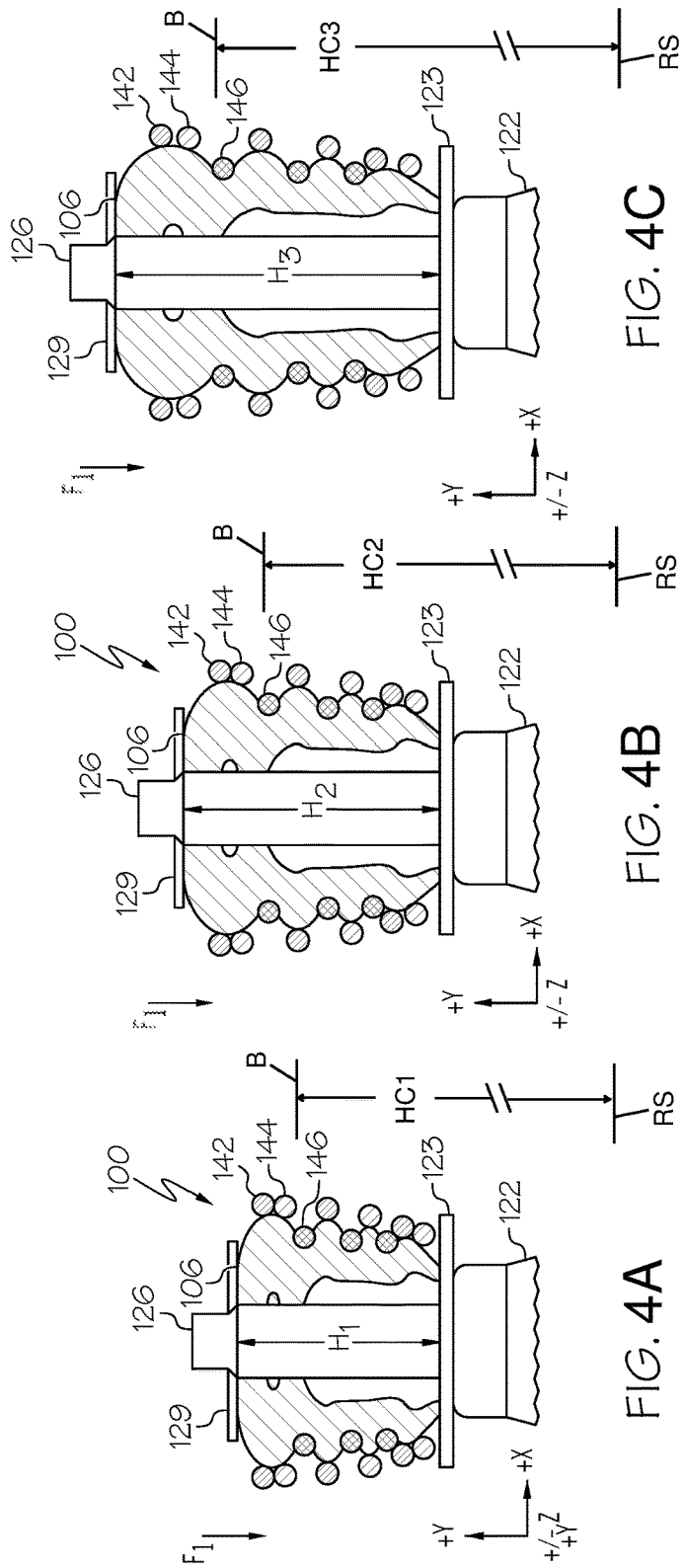

VARIABLE RATE BOUND STOPPERS AND VARIABLE RATE SUSPENSION SYSTEMS CONTAINING VARIABLE RATE BOUND STOPPERS

TECHNICAL FIELD

The present specification generally relates to bound stoppers for vehicle suspension systems and, more specifically, to bound stoppers with variable spring rates for vehicle suspension systems.

BACKGROUND

A suspension system for a vehicle typically includes various components such as shock absorbers, springs, stabilizer bars and the like. Such components are typically arranged between the vehicle wheel and a vehicle body, have a set of fixed (non-variable) properties and thereby provide a set of fixed handling characteristics for the vehicle. However, variable handling characteristics may be desirable, e.g. for a vehicle traveling under different road conditions, carrying loads of different weights, or the like.

Accordingly, a need exists for alternative suspension system components that provide a variable suspension system and variable handling characteristics.

SUMMARY

In one embodiment, a variable rate bound stopper includes an elastomer member. The elastomer member has an aperture such that the variable rate bound stopper is configured to be positioned over and disposed around a piston rod of a shock absorber. A shape memory alloy (SMA) coil formed from an SMA wire extends around at least a portion of the elastomer member. The SMA coil has a relaxed state and an activated state, and the SMA coil constrains the elastomer member from deforming radially outward and alters an intrinsic spring rate of the variable rate bound stopper when in the activated state. In embodiments, the SMA coil is at least two SMA coils formed from at least two SMA wires. Each of the at least two SMA coils have a relaxed state and an activated state, extend around at least a portion of the elastomer member, and constrain the elastomer member from deforming radially outward thereby altering an intrinsic spring rate of the bound stopper when in the activated state. The bound stopper may have a first spring rate when one of the at least two SMA coils is in the activated state and constrains the elastomer member, and a second spring rate when another of the at least two SMA coils is in the activated state and constrains the elastomer member. Also, the bound stopper may have a third spring rate when two of the at least two coils are in the activated state and constrain the elastomer member.

In another embodiment, a shock absorber includes a cylinder, a piston rod extending from the cylinder and a variable rate bound stopper with an elastomer member positioned over and disposed around the piston rod of the shock absorber. A shape memory alloy (SMA) coil formed from an SMA wire extends around at least a portion of the elastomer member. The SMA coil has a relaxed state and an activated state, and the SMA coil constrains the elastomer member from deforming radially outward thereby altering an intrinsic spring rate of the bound stopper when in the activated state. In embodiments, the SMA coil is at least two SMA coils formed from at least two SMA wires. Each of the at least two SMA coils have a relaxed state and an activated state, extend around at least a portion of the elastomer member, and constrain the elastomer member from deforming radially outward thereby altering an intrinsic spring rate of the bound stopper when in the activated state. The variable rate bound stopper may have a first spring rate when one of the at least two SMA coils is in the activated state and constrains the elastomer member, and a second spring rate when another of the at least two SMA coils is in the activated state and constrains the elastomer member. Also, the bound stopper may have a third spring rate when two of the at least two coils are in the activated state and constrain the elastomer member.

In embodiments, an electrical power source may be included and be in communication with the at least two SMA coils. The electrical power source is configured to provide an activation electric current to the at least two SMA coils. Each of the at least two SMA coils is in the relaxed state when the activation electric current is not passing through a given SMA coil(s) and in the activated state when the activation electric current is passing through a given SMA coil(s). A vehicle stability control (VSC) electronic control unit (ECU) in communication with the electrical power source and the at least two SMA coils may be included. The VSC ECU is configured to activate the electrical power source such that the electrical power source provides the activation electric current to the at least two SMA coils. In embodiments, at least one of a wheel speed sensor and a roll/yaw sensor is included and is in communication with the VSC ECU. The at least one speed sensor and roll/yaw sensor is configured to provide sensor feedback to the VSC ECU and the VSC ECU is configured to automatically activate the electrical power source as a function of the sensor feedback provided by the at least one speed sensor and roll/yaw sensor. The electrical power source provides the activation electrical current to at least one of the at least two SMA coils when activated by the VSC ECU.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4A schematically depicts the variable rate bound stopper of FIG. 2A subjected to a load compression force and having a first spring rate;

FIG. 4B schematically depicts the variable rate bound stopper of FIG. 2A subjected to a load compression force and having a second spring rate;

FIG. 4C schematically depicts the variable rate bound stopper of FIG. 2A subjected to a load compression force and having a third spring rate;

DETAILED DESCRIPTION

A variable rate bound stopper is provided. As used herein, the term "variable bound stopper" refers to a bound stopper having an intrinsic spring rate that may be externally altered via activation of a shape memory alloy (SMA) coil extending at least partially around the bound stopper. As used herein the term "intrinsic spring rate" refers to a spring rate or plurality of spring rates a bound stopper has without at least one SMA coil constraining the elastomer member from deforming radially when subjected to a compressive force. The variable rate bound stopper may include an elastomer member with an aperture dimensioned for the elastomer member to be positioned onto and disposed around a piston rod of a shock absorber. At least one coil formed from an SMA wire (hereafter referred to as an SMA coil) extends and winds around at least a portion of the elastomer member. The at least one SMA coil has a relaxed state and an activated state. In the activated state, the at least one SMA coil constrains the elastomer member from deforming when subjected to a compressive force and alters an intrinsic spring rate of the variable rate bound stopper. The at least one SMA coil may be activated by passing an electrical current through the SMA wire thereby heating the SMA wire and transforming the SMA wire from a first SMA phase to a second SMA phase. In embodiments, the first SMA phase is a low temperature SMA phase and the second SMA phase is a high temperature SMA phase. Various embodiments of variable bound stoppers and variable rate shock absorbers containing variable rate bound stoppers will be described in further detail herein with specific reference to the appended drawings.

Figure 2A:
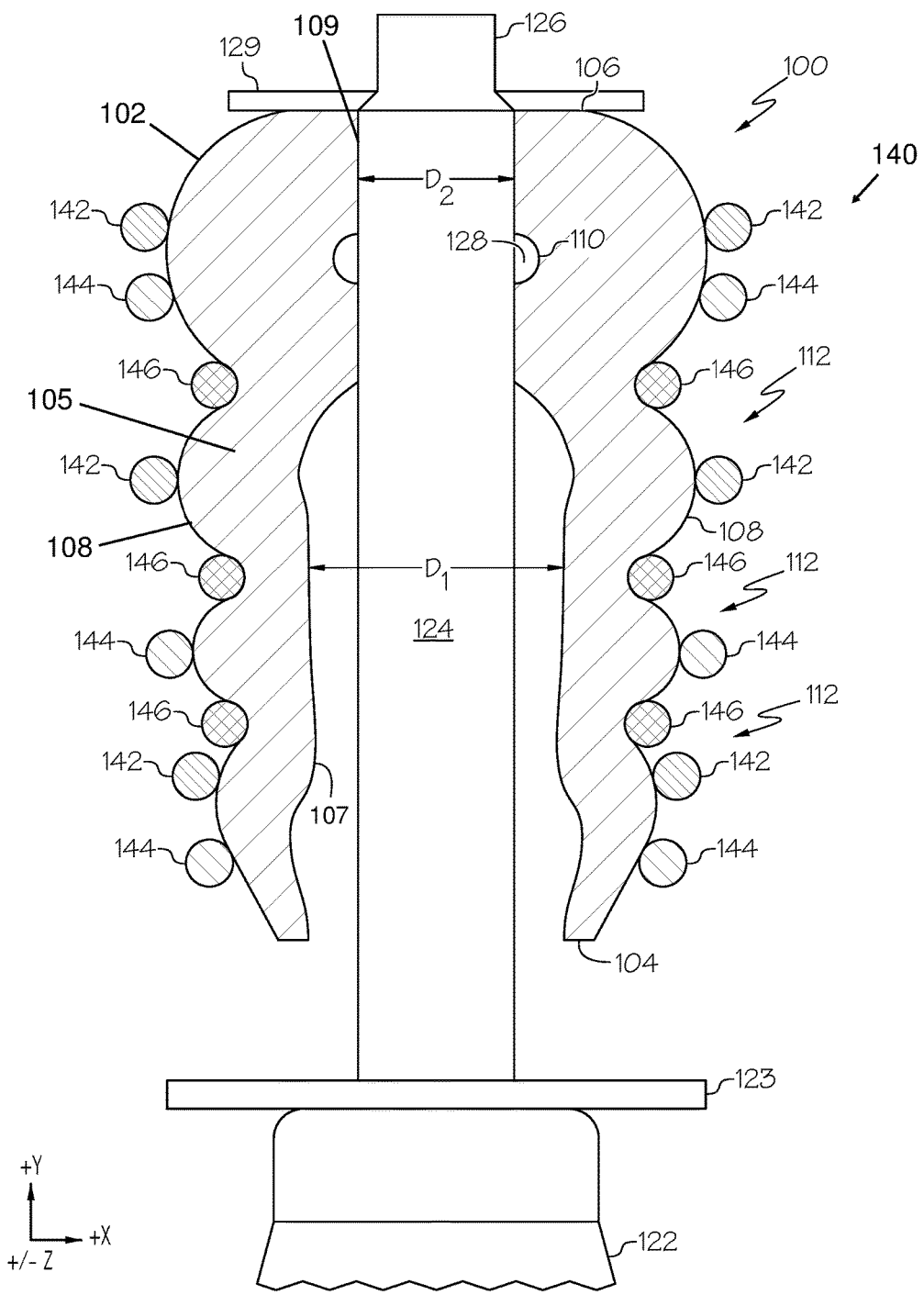
FIG. 2A schematically depicts a side cross-sectional view of a variable rate bound stopper according to one or more embodiments described and illustrated herein.

FIG. 2A generally depicts one embodiment of a variable rate bound stopper. The variable rate bound stopper includes an elastomer member with an aperture dimensioned for the elastomer member to be positioned over and disposed around a piston rod of a shock absorber. The variable rate bound stopper has at least one SMA coil extending around at least a portion of the elastomer member. The SMA coil may be activated by passing an activation electrical current through the SMA coil thereby heating the SMA wire of the SMA coil above a transformation temperature such that the SMA transforms from a first SMA phase to a second SMA phase. Upon transforming from the first SMA phase to the second SMA phase, the SMA coil contracts around the elastomer member and constrains the elastomer member from deforming radially outward (+/−X direction in the figures) when subjected to a compressive force. Constraining the elastomer member from radial displacement when subjected to a compressive force alters the intrinsic spring rate of the elastomer member. That is, when the elastomer member is subjected to a given compressive force and the SMA coil is in its activated state, the elastomer member is restrained from deforming radially outward and has a higher spring rate (i.e., is "stiffer") in comparison to when the elastomer member is subjected to the given compression force and the SMA coil is in its relaxed state. In embodiments, at least two SMA coils extend around at least a portion of the elastomer member and each of the at least two SMA coils may be independently activated so as to provide the elastomer member with a first spring rate when one of the at least two SMA coils is activated and a second spring rate when another of the at least two SMA coils is activated. In the alternative, or in addition to, two or more of the at least two SMA coils may be activated and provide the elastomer member with a third spring rate. It is understood that more than two SMA coils, e.g. three or more, four or more, or five or more SMA coils, may be wrapped or wound around at least a portion of an elastomer member and independently activated such that the variable bond stopper has a plurality of spring rates, e.g., four or more spring rates, five or more spring rates, etc.

Figure 1:
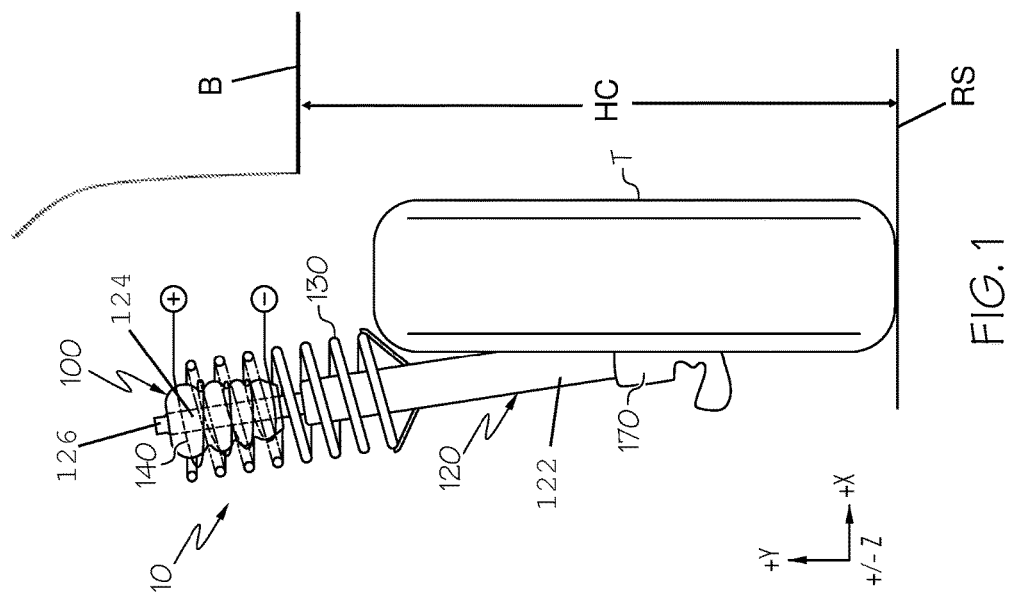
FIG. 1 schematically depicts a front view of a variable rate vehicle suspension system with a variable rate bound stopper according to one or more embodiments described and illustrated herein.

Referring now to FIG. 1, embodiments of a variable rate vehicle suspension system 10 include a variable rate bound stopper 100, a shock absorber 120, and a spring 130. The shock absorber 120 includes a cylinder 122 and a piston rod 124 slidably engaged with and extending from the cylinder 122. The cylinder 122 of the shock absorber 120 is mechanically connected to a knuckle 170 which is mechanically connected to a tire T. The piston rod 124 includes an upper rod end 126 mechanically connected to a vehicle body (not shown). The shock absorber 120 is configured to dampen vibrations transmitted from the tire T toward the vehicle body and maintain a height control distance HC between a body component B and a road surface RS on which the tire T and vehicle are located. The variable rate bound stopper 100 may be generally cylindrically shaped and be positioned on and disposed around the piston rod 124. An SMA coil assembly 140 formed from a SMA wire extends around at least a portion of the variable rate bound stopper 100 and is sized to be received within an inner diameter of the spring 130. The SMA coil assembly 140 is in communication with an electrical power source. It is understood that while FIG. 1 depicts the variable rate bound stopper 100 in combination with the shock absorber 120 and spring 130, e.g., as part of a strut assembly, the variable rate bound stopper 100 may be used with the shock absorber 120 without the spring 130.

Referring now to FIG. 2A, an expanded side cross-sectional view of the variable rate bound stopper 100 is depicted. The variable rate bound stopper 100 includes an elastomer member 102 with a lower end 104 and an upper end 106. Extending between the lower end 104 and the upper end 106 is a side wall 105. The side wall 105 has an inner surface 107 and an outer surface 108. In embodiments, a lower portion (−Y direction) of the elastomer member 102 has a first diameter $D_1$ and an upper portion (+Y direction) of the elastomer member has a second diameter $D_2$. The second diameter $D_2$ is dimensioned for the elastomer member 102 to slide over and have an interference fit with the piston rod 124 of the shock absorber 120. The piston rod 124 may have a tab 128 extending radially (+/−X direction) from the piston rod 124 and the elastomer member 102 may have a notch 110 that is complimentary with the tab 128 such that the elastomer member 102 fits and is secured onto the piston rod 124 at a desired position. An upper flange 129 positioned proximate to the upper rod end 126 of the piston rod 124 may be included to ensure the upper end 106 of the elastomer member 102 does not slide past or off of the piston rod 124 during compression of the elastomer member 102. Extending around, e.g., wound around in a corkscrew manner, at least a portion of the elastomer member 102 is the SMA coil assembly 140 including a first SMA coil 142 formed from an SMA wire. In embodiments depicted in FIG. 2A, the first SMA coil 142 extends around the outer surface 108 of the elastomer member 102. In other embodiments, the first SMA coil 142 is embedded within the elastomer member 102 as described in greater detail below. In some embodiments, more than one SMA coil may be wound around at least a portion of the elastomer member 102 as part of the SMA coil assembly 140. For example, FIG. 2A depicts a second SMA coil 144 and a third SMA coil 146 wound around at least a portion of the elastomer member 102. It is understood that the second SMA coil 144 and the third SMA coil 146 are also formed from SMA wires and may be separate from each other, i.e., the first SMA coil 142, the second SMA coil 144 and the third SMA coil 146 may be three separate and distinct SMA coils. It is also understood one or more of the SMA coils 142, 144, 146 may be formed from different shape memory alloys with different properties such that one or more of the SMA coils 142, 144, 146 have different properties and can operate independently.

Figure 2B:
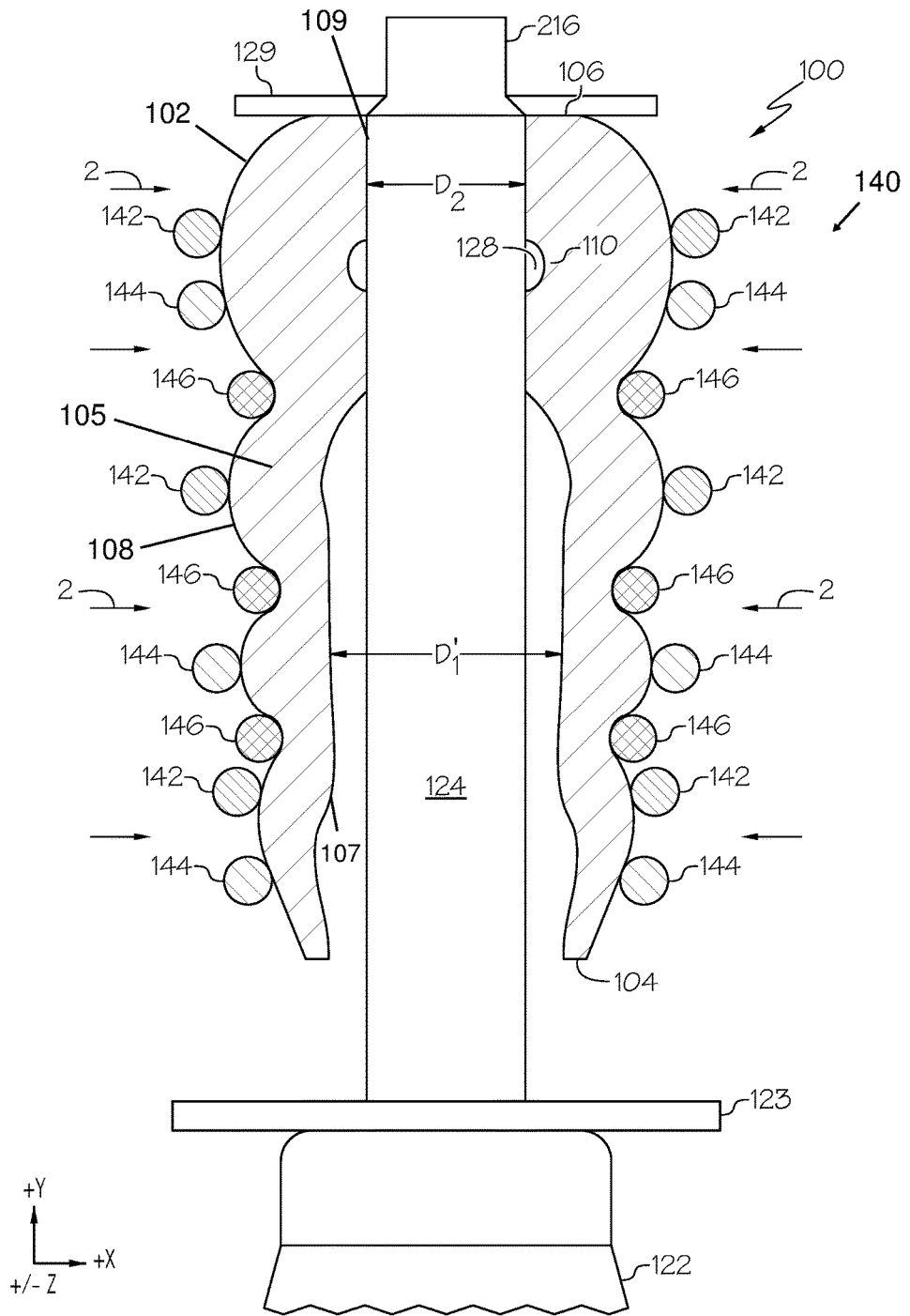
FIG. 2B schematically depicts the variable rate bound stopper of FIG. 2A constrained by at least one SMA coil in an activated state.

Referring to FIGS. 2A-2B, activation of one or more of the SMA coils 142, 144, 146 with a corresponding radial contraction (+/−X direction) of the elastomer member 102 is depicted in FIG. 2B. Not being bound by theory, the SMA wire forming the SMA coils 142, 144, 146 has a transformation temperature below which the SMA exists in a first SMA phase (e.g., a low temperature SMA phase) and above which the SMA exists in a second SMA phase (e.g., a high temperature SMA phase). Transformation from the first SMA phase to the second SMA phase, and vice-versa, typically results in a change of yield strength of the SMA wire and a reversible strain of the SMA wire. For example and without limitation, a nickel-titanium (Ni—Ti) alloy with generally equal proportions of Ni and Ti (commercially known as Nitinol) has or exists in a low temperature martensite phase below a transformation temperature and has or exists in a high temperature austenite phase above the transformation temperature. The low temperature martensite phase for the shape memory Ni—Ti alloys has a typical yield strength of about 100 megapascal (MPa) and the high temperature austenite phase has a typical yield strength of about 560 MPa, i.e. about a five-fold increase in strength. Also, transformation from the low temperature martensite phase to a high temperature austenite phase, and vice-versa, results in a reversible strain of up to 8% for shape memory Ni—Ti alloys. Accordingly, when one or more of the SMA coils 142, 144, 146 transform from the first SMA phase to the second SMA phase, the respective one or more SMA coils 142, 144, 146 exhibit an increase in yield strength and/or a change in physical dimension (e.g., length).

Still referring to FIGS. 2A-2B, activation of the one or more of the SMA coils 142, 144, 146, e.g., by flowing an activation electrical current through and increasing the temperature of one or more of the SMA coils 142, 144, 146 such that one or more of the SMA coils transforms from a low temperature SMA phase to a high temperature SMA phase, may increase the yield strength of the one or more SMA coils 142, 144, 146 that is activated. As used herein the term "activation electrical current" refers to an electrical current sufficient to increase the temperature of an SMA coil via electrical resistance heating above a transformation temperature for the SMA from which the SMA coil is formed. Increasing the yield strength of the SMA wire that forms the SMA coils 142, 144, 146 increases resistance of radial displacement of the elastomer member 102 when subjected to a compression force. In the alternative, or in addition to, activation of the one or more of the SMA coils 142, 144, 146 may result in a reversible strain of the one or more SMA coils 142, 144, 146 that is activated. The reversible strain may decrease a length of the SMA wire that forms the SMA coils 142, 144, 146 thereby resulting in an SMA coil with a reduced diameter. That is, each of the SMA coils 142, 144, 146 have a first coil diameter when the SMA coils 142, 144, 146 are in a relaxed state and a second coil diameter when the SMA coils 142, 144, 146 are in an activated state. In embodiments, the first coil diameter is greater than the second coil diameter. In other embodiments, the first coil diameter is less than the second coil diameter. Reducing the coil diameter of the SMA coils 142, 144, 146 provides an inward force '2' on the elastomer member 102 as depicted in FIG. 2B. The inward force 2 applied to the elastomer member 102 by the one or more SMA coils 142, 144, 146 in the activated state reduces or attempts to reduce (constrains) the diameter $D_1$ of the elastomer member 102 shown in FIG. 2A to the diameter $D_1'$ shown in FIG. 2B. It is understood that reducing or attempting to reduce the diameter $D_1$ of the elastomer member 102 constrains the elastomer member 102 from deforming in a radial direction (+/−X direction) when a compression force is applied to the elastomer member 102 as described below.

Figure 3C:
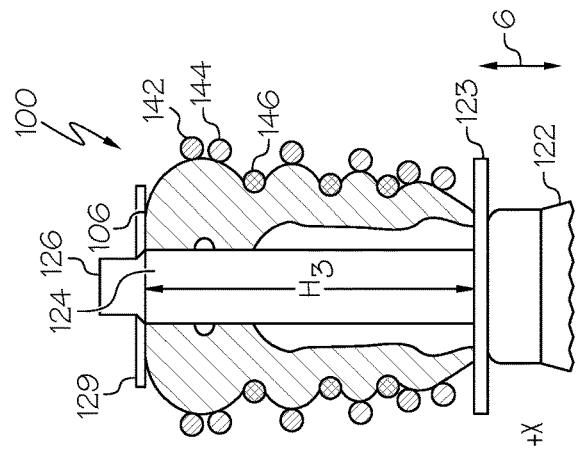
FIG. 3C schematically depicts the variable rate bound stopper of FIG. 2A subjected to a vibration compression force and having a third spring rate.
Figure 3B:
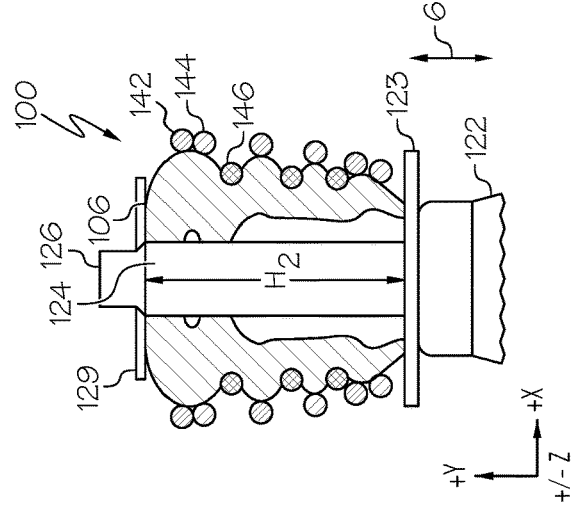
FIG. 3B schematically depicts the variable rate bound stopper of FIG. 2A subjected to a vibration compression force and having a second spring rate.
Figure 3A:
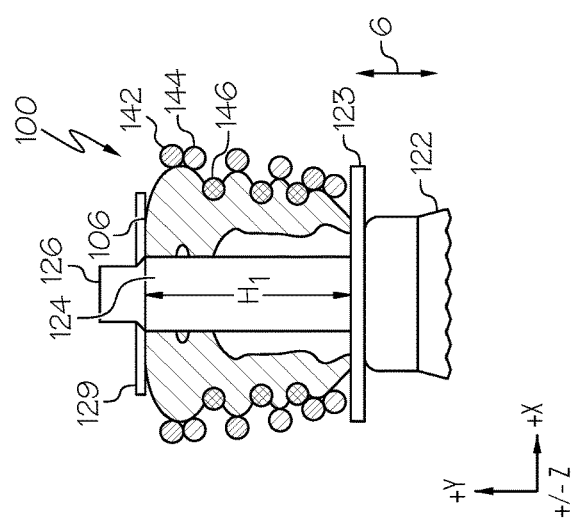
FIG. 3A schematically depicts the variable rate bound stopper of FIG. 2A subjected to a vibration compression force and having a first spring rate.

Referring to FIGS. 3A-3C, a series of spring rates for the variable rate bound stopper 100 subjected to a given vibration compression force '6' is depicted. Particularly, FIGS. 3A-3C depict compression of the variable rate bound stopper 100 due to the piston rod 124 sliding within the cylinder 122 due to the vibration compression force 6. For example and without limitation, the vibration compression force 6 may be due vibration from the tire T (FIG. 1) impacting an object (e.g., a pot hole) on a road or the tire T traveling on a rough road surface with bumps, holes, etc. Upon compression of the shock absorber 120, a lower flange 123 moves in a direction towards the variable rate bound stopper 100 (+Y direction) and comes into contact with the lower end 104 of the elastomer member 102. In FIG. 3A, the elastomer member 102 is compressed to a height $H_1$ when the variable rate bound stopper 100 is subjected to the vibration compression force 6. In FIG. 3B, the elastomer member 102 is compressed to a height $H_2$ which is greater than the height $H_1$ when the variable rate bound stopper 100 is subjected to the vibration compression force 6. In FIG. 3C, the elastomer member 102 is compressed to a height $H_3$ which is greater than the height $H_2$ when the variable rate bound stopper 100 is subjected to the vibration compression force 6. In embodiments, compression of the elastomer member 102 to the height $H_1$ depicted in FIG. 3A is due to the activation of the first SMA coil 142, compression of the elastomer member 102 to the height $H_2$ depicted in FIG. 3B is due to the activation of SMA coils 142 and 144, and compression of the elastomer member 102 to the height $H_3$ depicted in FIG. 3C is due to the activation of SMA coils 142, 144 and 146. In other embodiments, compression of the elastomer member 102 to the height $H_1$ depicted in FIG. 3A is due to the activation of the first SMA coil 142, compression of the elastomer member 102 to the height $H_2$ depicted in FIG. 3B is due to the activation of the second SMA coil 144, and compression of the elastomer member 102 to the height $H_3$ depicted in FIG. 3C is due to the activation of the third SMA coil 146. In still other embodiments, compression of the elastomer member 102 to the height $H_1$ depicted in FIG. 3A is due to the activation of the first SMA coil 142, compression of the elastomer member 102 to the height $H_2$ depicted in FIG. 3B is due to the activation of SMA coils 142 and 144, and compression of the elastomer member 102 to the height $H_3$ depicted in FIG. 3C is due to the activation of SMA coils 142 and 146. Accordingly, it is understood that compression of the elastomer member 102 to a given height when subjected to a vibration compression force may be provided by any number or combination of SMA coils being activated.

The compression of the elastomer member 102 to the different heights when subjected to the same vibration compression force 6 is the result of the variable rate bound stopper 100 depicted in FIGS. 3A-3C having different springs. For example and without limitation, the variable rate bound stopper 100 depicted in FIG. 3A has a first spring rate, the variable rate bound stopper 100 depicted in FIG. 3B has a second spring rate greater than the first spring rate, and the variable rate bound stopper 100 depicted in FIG. 3C has a third spring rate, greater than the second spring rate. It is also understood that other SMA coil activation arrangements or scenarios than discussed above in reference to FIGS. 3A-3C may be used to provide the variable rate bound stopper with a desired spring rate.

While FIGS. 3A-3C depict the variable rate bound stopper 100 having different spring rates in response to a vibration compression force, the variable rate bound stopper 100 may have different spring rates in response to a constant load applied to the shock absorber 120. For example and without limitation, a constant load in a bed of a pickup truck may reduce the height of the bed and/or rear bumper of the pickup truck relative to a road surface the pickup truck is traveling on. Also, it may be desirable to offset or counter the reduced height of the bed, fender, rear bumper or other body component of the pickup truck (referred to herein as "height control") as described below.

Referring now to FIGS. 4A-4C, a series of spring rates for the variable rate bound stopper 100 subjected to a given load force '$F_1$' is depicted. Particularly, FIGS. 4A-4C depict compression of the shock absorber 120 and the variable rate bound stopper 100 due to a generally constant load that results in the force $F_1$ being transferred or applied to the variable rate bound stopper 100. For example and without limitation, the force $F_1$ on the variable rate bound stopper 100 may be due to a load in a bed of pickup truck (not shown) exerting a force on the shock absorber 120 such that the shock absorber 120 is compressed, i.e., the piston rod 124 slides within the cylinder 122 (−Y direction). Upon compression of the shock absorber 120, the variable rate bound stopper 100 moves in a direction towards the cylinder 122 (−Y direction) and the lower end 104 of the elastomer member 102 comes into contact with the lower flange 123 and is compressed. In FIG. 4A, the elastomer member 102 is compressed to a height $H_1$ and provides a control height distance HC1 when the variable rate bound stopper 100 is subjected to the load force $F_1$. In FIG. 4B, the elastomer member 102 is compressed to a height $H_2$ and a control height distance HC2 which is greater than the height $H_1$ and control height distance HC1, respectively, when the variable rate bound stopper 100 is subjected to the load force $F_1$. In FIG. 4C, the elastomer member 102 is compressed to a height $H_3$ and control height distance HC3 which is greater than the height $H_2$ and control height distance HC2, respectively, when the variable rate bound stopper 100 is subjected to the load force $F_1$. In embodiments, compression of the elastomer member 102 to the height $H_1$ depicted in FIG. 4A is due to the activation of the first SMA coil 142, compression of the elastomer member 102 to the height $H_2$ depicted in FIG. 4B is due to the activation of SMA coils 142 and 144, and compression of the elastomer member 102 to the height $H_3$ depicted in FIG. 4C is due to the activation of SMA coils 142, 144, 146. In other embodiments, compression of the elastomer member 102 to the height $H_1$ depicted in FIG. 4A is due to the activation of the first SMA coil 142, compression of the elastomer member 102 to the height $H_2$ depicted in FIG. 4B is due to the activation of the second SMA coil 144, and compression of the elastomer member 102 to the height $H_3$ depicted in FIG. 4C is due to the activation of the third SMA coil 146. In still other embodiments, compression of the elastomer member 102 to the height $H_1$ depicted in FIG. 4A is due to the activation of the first SMA coil 142, compression of the elastomer member 102 to the height $H_2$ depicted in FIG. 4B is due to the activation of SMA coils 142 and 144, and compression of the elastomer member 102 to the height $H_3$ depicted in FIG. 4C is due to the activation of SMA coils 142 and 146. Accordingly, it is understood that compression of the elastomer member 102 to a given height when subjected to a load force may be provided by any number or combination of SMA coils being activated.

The compression of the elastomer member 102 to the different heights when subjected to the same load force $F_1$ is the result of the variable rate bound stopper 100 depicted in FIGS. 4A-4C having different spring rates. For example and without limitation, the variable rate bound stopper 100 depicted in FIG. 4A has a first spring rate, the variable rate bound stopper 100 depicted in FIG. 4B has a second spring rate greater than the first spring rate, and the variable rate bound stopper 100 depicted in FIG. 4C has a third spring rate, greater than the second spring rate. It is also understood that other SMA coil activation arrangements or scenarios than discussed above in reference to FIGS. 4A-4C may be used to provide the variable rate bound stopper with a desired spring rate.

Figure 5:
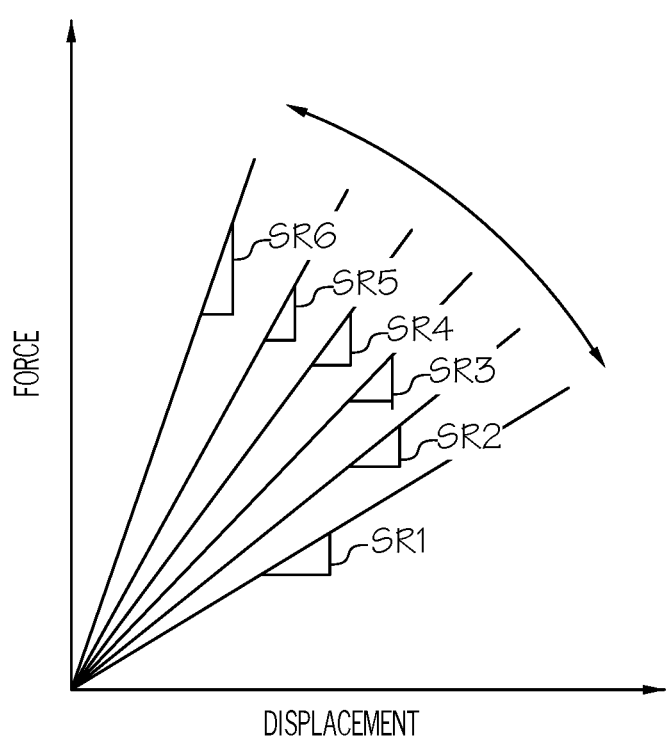
FIG. 5 graphically depicts a plurality of spring rates for a variable rate bound stopper according to one or more embodiments described and illustrated herein.

Referring now to FIG. 5, a graphical depiction of a plurality of springs rates (SR1, SR2, . . . SR6) of the variable rate bound stopper 100 is depicted. Particularly, displacement (compression; −Y direction) of the variable rate bound stopper 100 as a function of force applied to the variable rate bound stopper 100 is shown in FIG. 5. For example and without limitation, the variable rate bound stopper 100 may have a first spring rate SR1 when none of the SMA coils 142, 144, 146 are activated, a second spring rate SR2 when only the first SMA coil 142 is activated and a third spring rate SR3 when SMA coils 142 and 144 are activated. The variable rate bound stopper 100 may have a fourth spring rate SR4 when SMA coils 142 and 146 are activated, a fifth spring rate SR5 when SMA coils 144 and 146 are activated and a sixth spring rate SR6 when SMA coils 142, 144, 146 are activated. Accordingly, the variable rate bound stopper 100 may have a wide range of spring rates provided by activation of two or more SMA coils and the spring rates may be provided by any number or combination of the SMA coils being activated. While FIG. 5 illustrates a linear relationship between force and displacement, it is understood that the bound stoppers and variable rate bound stoppers described herein may have a non-linear relationship between force and displacement, for example and without limitation a parabolic relationship, a logarithmic relationship, an exponential relationship, or the like. Accordingly, FIG. 5 schematically illustrates a variable rate bound stopper as described herein having a plurality of spring rates as a function of a plurality of SMA coils as described herein being activated and constraining radial deformation of the variable rate bound stopper.

Figure 6:
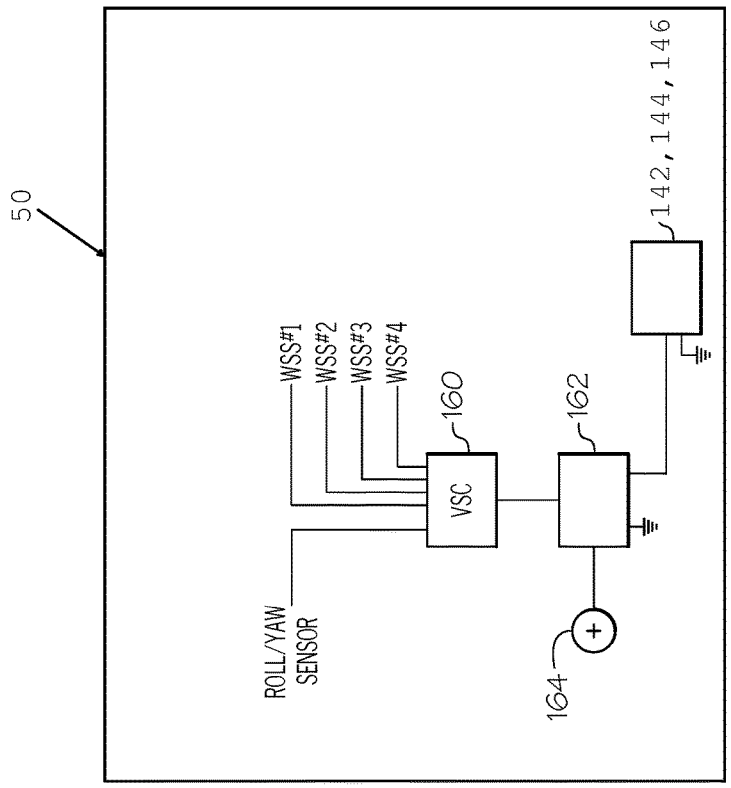
FIG. 6 schematically depicts a plurality of vehicle motion sensors, a vehicle stability control (VSC) electronic control unit (ECU), a shape memory alloy (SMA) controller, an electrical power source and a plurality of SMA coils.

Referring now to FIGS. 1 and 6, a vehicle 50 may include a variable rate vehicle suspension system 10 and a plurality of vehicle motion sensors. Particularly, a plurality of wheel speed sensors WSS#1, WSS#2, WSS#3, and WSS#4 may be in communication with a VSC ECU 160. At least one roll/yaw sensor may also be in communication with the VSC ECU 160. The VSC ECU 160 may be in communication with an SMA coil controller 162, an electrical power source 164 and SMA coils 142, 144, 146. In embodiments, the plurality of vehicle motion sensors provide sensor feedback related to the motion of the vehicle to the VSC ECU 160 and the VSC ECU 160 provides spring rate instructions to the SMA coil controller 162. The SMA coil controller 162 is configured to activate the electrical power source 164 as a function of the spring rate instructions received from the VSC ECU 160. Upon activation of the electrical power source 164 and depending on the spring rate instructions from the SMA coil controller 162, the electrical power source 164 provides an activation electrical current to one or more of the SMA coils 142, 144, 146. The activation electrical current flows through the one or more SMA coils 142, 144, 146 and the temperature of the one or more SMA coils 142, 144, 146 increases from a temperature below a transformation temperature of the one or more SMA coils 142, 144, 146 to a temperature above the transformation temperature of the one or more SMA coils 142, 144, 146. Increasing the temperature of the one or more SMA coils 142, 144, 146 from below the transformation temperature to above the transformation temperature results in the one or more SMA coils 142, 144, 146 transforming from a low temperature SMA phase to a high temperature SMA phase. The one or more SMA coils 142, 144, 146 in the low temperature SMA phase are in a relaxed state and the one or more SMA coils 142, 144, 146 in the high temperature SMA phase are in an activated state. Transformation of the one or more SMA coils 142, 144, 146 from the low temperature SMA phase to the high temperature SMA phase results in a reversible strain of the one or more SMA coils 142, 144, 146, i.e., the one or more SMA coils 142, 144, 146 contract around the variable rate bound stopper 100 and constrain the variable rate bound stopper 100 from deforming radially outward (+/−X direction) when subjected to a compressive force.

While FIG. 6 depicts the VSC ECU 160 configured to activate the electrical power source 164 via the SMA coil controller 162, in embodiments the VSC ECU 160 activates the electrical power source 164 directly, i.e., the VSC ECU 160 may be configured to activate the electrical power source 164 without the use of the SMA coil controller 162. Also, activation of the one or more SMA coils 142, 144, 146 by the electrical power source 164 may be referred to herein as activation of the one or more SMA coils 142, 144, 146 by the VSC ECU 160.

Referring to FIGS. 1, 3A-3C, 4A-4C and 6, the VSC ECU 160 may activate one or more of the SMA coils 142, 144, 146 and thereby alter the intrinsic spring rate of the variable rate bound stopper 100. Particularly, the plurality of vehicle motion sensors provide vehicle speed and roll/yaw feedback to the VSC ECU 160. In embodiments, the VSC ECU 160 may automatically activate one or more of the SMA coils 142, 144, 146 as a function of the sensor feedback from at least one of the wheel speed sensors WSS#1, WSS#2, WSS#3, WSS#4, the roll/yaw sensor and a combination thereof. In the alternative, or in addition to, the VSC ECU 160 may activate one or more of the SMA coils 142, 144, 146 as a function of a load force applied to the variable rate bound stopper 100, a height of a bed or rear bumper of a pickup truck from a road surface the pickup truck is traveling on, or the like. In some embodiments, the VSC ECU 160 may activate one or more of the SMA coils 142, 144, 146 as a function of a user selection. For example and without limitation, a user of the vehicle 50 may desire a "stiffer" or "softer" ride and/or the rear bumper of the vehicle 50 to have a higher or lower height from the road surface the vehicle 50 is traveling on. That is, the user of the vehicle 50 may desire the variable rate vehicle suspension system 10 of the vehicle 50 to have a higher or lower spring rate and/or a higher or lower vehicle height control. In such examples, the user may manually select a given spring rate and/or height control for the variable rate vehicle suspension system 10. The manually selected spring rate and/or height control is transmitted to the VSC ECU 160 and the VSC ECU 160 activates one or more of the SMA coils 142, 144, 146 as a function of the user selection. Activation of the one or more SMA coils 142, 144, 146 provides the desired spring rate and/or height control.

Figure 7:
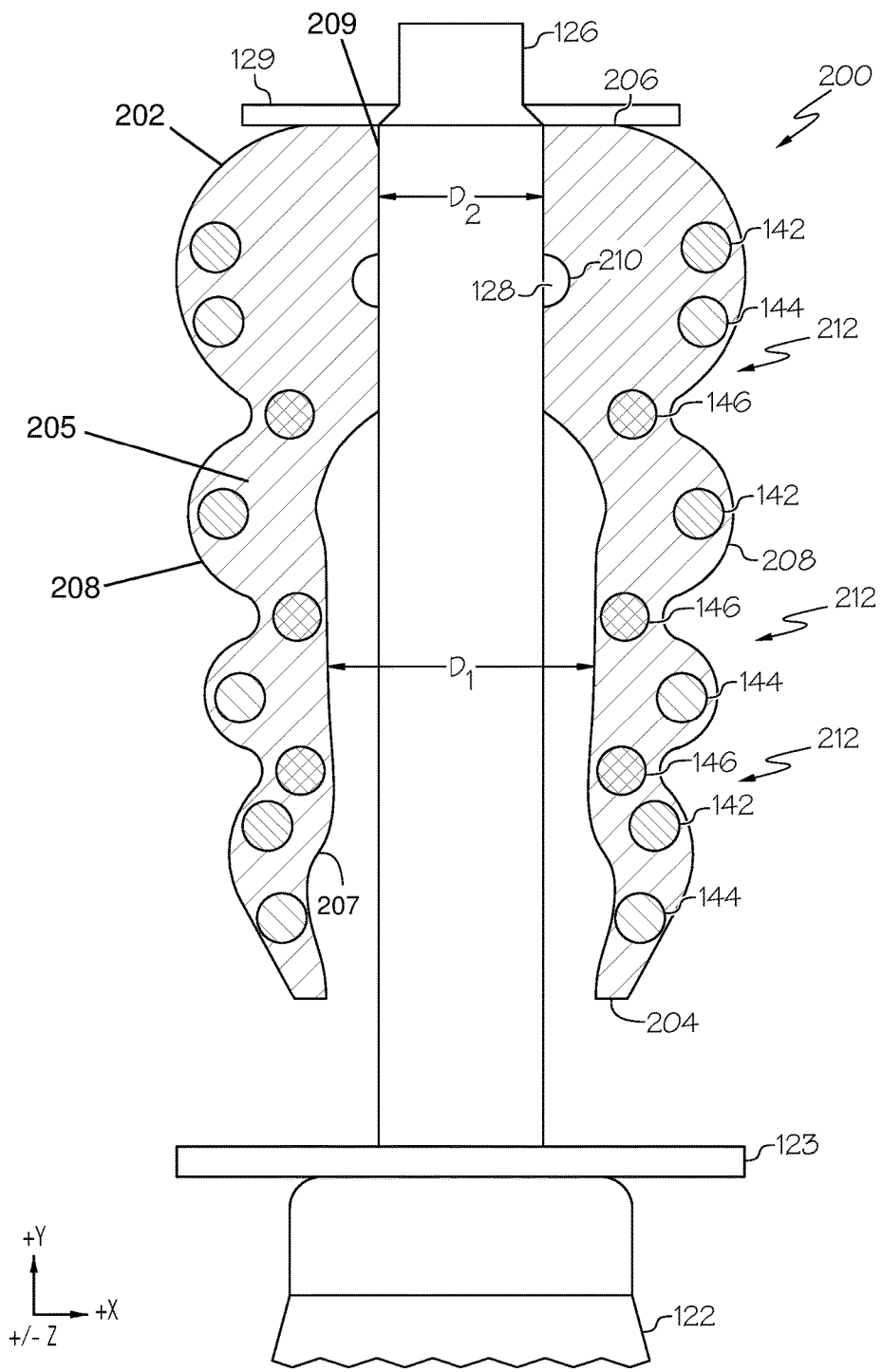
FIG. 7 schematically depicts a side cross-sectional view of a variable rate bound stopper according to one or more embodiments described and illustrated herein.

Referring to FIG. 7, another embodiment of a variable rate bound stopper 200 is depicted. Particularly, the variable rate bound stopper 200 may be similar to the variable rate bound stopper 100 discussed above except the SMA coils 142, 144, 146 are embedded within the elastomer member 102. The SMA coils 142, 144, 146 may be embedded in the elastomer member 102 during the forming of the elastomer member 102 and embedding the SMA coils 142, 144, 146 within the elastomer member 102 may protect the SMA coils 142, 144, 146 from the environment during operation of a vehicle that has a variable rate vehicle suspension system 10 with the variable rate bound stopper 100. It is understood that the SMA coils 142, 144, 146 may be embedded within the elastomer member 102 with end portions of the SMA coils 142, 144, 146 extending from the elastomer member 102 such that the electrical power source 164 is in communication with the SMA coils 142, 144, 146 and the VSC ECU 160 in combination with the electrical power source 164 may activate one or more of the SMA coils 142, 144, 146 as discussed above with reference to FIGS. 3A-3C and 4A-4C.

Figure 8:
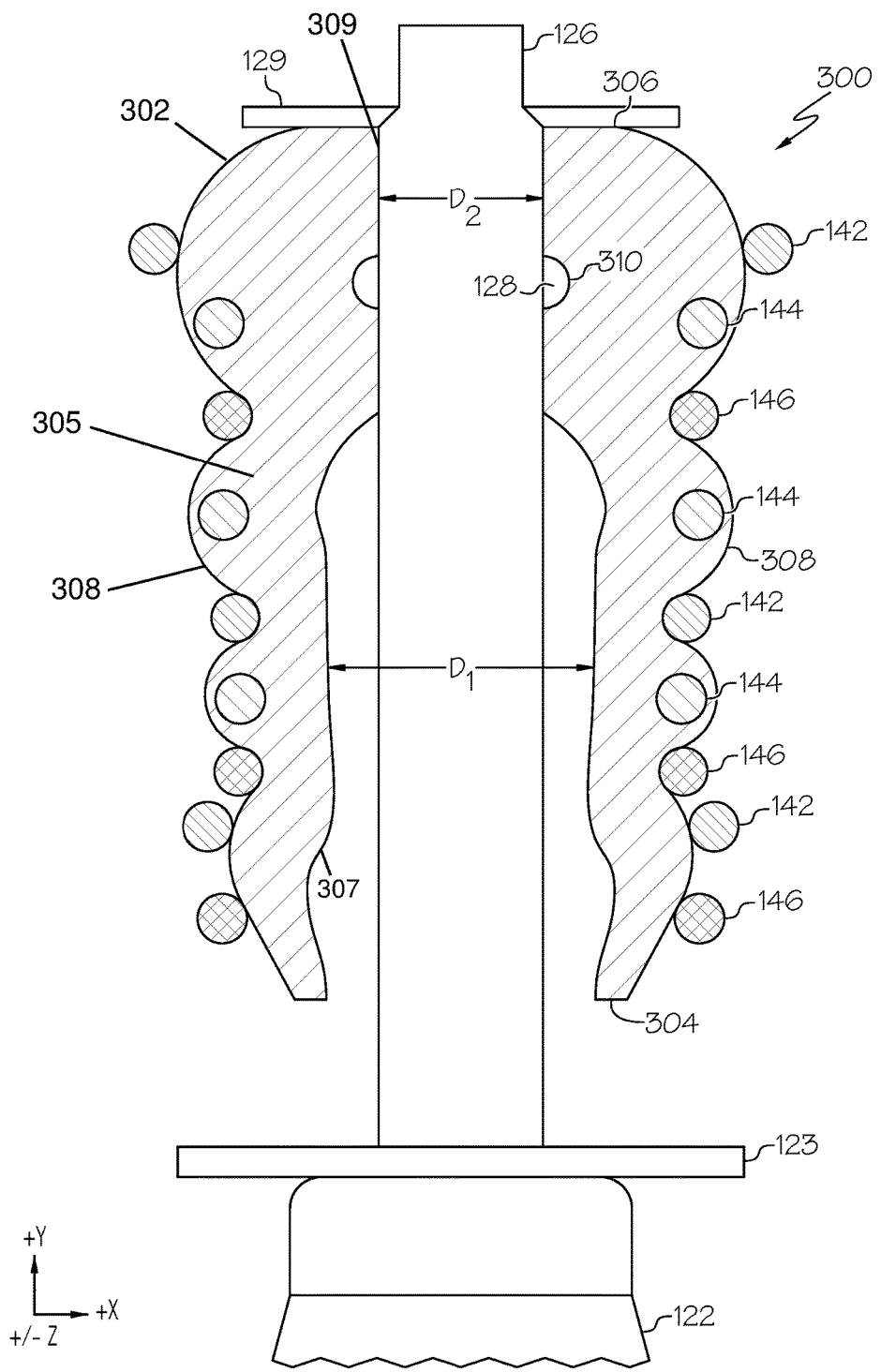
FIG. 8 schematically depicts a side cross-sectional view of a variable rate bound stopper according to one or more embodiments described and illustrated herein.

Referring to FIG. 8, another embodiment of a variable rate bound stopper 300 is depicted. Particularly, the variable rate bound stopper 300 may be similar to the variable rate bound stopper 100 and/or variable rate bound stopper 200 discussed above except only a subset of the SMA coils 142, 144, 146 are embedded within the elastomer member 302. As depicted in FIG. 8, SMA coils 142, 146 extending around the outer surface 308 of the elastomer member 302 and the second SMA coil 144 is embedded within the elastomer member 302. While FIG. 8 depicts two of the SMA coils (SMA coils 142, 146) extending around the outer surface 308 of the elastomer member 302 and one of the SMA coils (second SMA coil 144) embedded within the elastomer member 302, it is understood that a subset of any number of SMA coils used to alter the intrinsic spring rate of the variable rate bound stopper 300 may extend around the outer surface 308 of the elastomer member 302 or be embedded within the elastomer member 302.

In embodiments, the elastomer member described herein is formed from an elastomeric material such as, without limitation, polyurethane, natural rubber, or the like. The SMA coils and SMA wires described herein is formed from a shape memory material such as, without limitation, shape memory alloys, shape memory polymers, or the like.

The above-described variable rate bound stoppers can provide a bound stopper having variable spring rates due to activation/deactivation of one or more SMA coils that are used to constrain radial deflection of the bound stoppers to differing degrees. Operation of the SMA coils can be automatic, such as based on sensor feedback from one or more vehicle motion sensors or based on a detected height of the vehicle from the ground, or manual, such as based on user ride preferences.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A variable rate bound stopper comprising:
   a bound stopper comprising an elastomer member with an aperture, the bound stopper configured to be positioned over and disposed around a piston rod of a shock absorber;
   a shape memory alloy (SMA) coil formed from an SMA wire extending around at least a portion of the elastomer member, the SMA coil comprising a relaxed state and an activated state, wherein:
   the SMA coil constrains the elastomer member from deforming radially outward in both the relaxed state and the activated state thereby altering an intrinsic spring rate of the bound stopper in both the relaxed state and the activated state.

2. The variable rate bound stopper of claim 1, wherein:
   the SMA coil is at least two SMA coils formed from at least two SMA wires;
   each of the at least two SMA coils comprising the relaxed state and the activated state;
   each of the at least two SMA coils extend around at least a portion of the elastomer member;
   each of the at least two SMA coils constrain the elastomer member from deforming radially outward and alter an intrinsic spring rate of the bound stopper when in the activated state.

3. The variable rate bound stopper of claim 2, wherein:
   the bound stopper has a first spring rate when one of the at least two SMA coils is in the activated state and constrains the elastomer member; and
   the bound stopper has a second spring rate when another of the at least two SMA coils is in the activated state and constrains the elastomer member.

4. The variable rate bound stopper of claim 3, wherein the bound stopper has a third spring rate when two of the at least two coils are in the activated state and constrain the elastomer member.

5. The variable rate bound stopper of claim 1, further comprising an electrical power source in communication with the SMA coil, the electrical power source configured to provide an activation electric current to the SMA coil.

6. The variable rate bound stopper of claim 5, wherein the SMA coil is in the relaxed state when the activation electric current is not passing through the SMA coil and in the activated state when the activation electric current is passing through the SMA coil.

7. The variable rate bound stopper of claim 1, further comprising a vehicle stability control (VSC) electronic control unit (ECU) and an electrical power source in communication with the SMA wire, wherein the VSC ECU is configured to activate the electrical power source and the electrical power source is configured to provide an activation electric current to the SMA wire when the electrical power source is activated.

8. The variable rate bound stopper of claim 7, further comprising at least one of a wheel speed sensor and a roll/yaw sensor in communication with the VSC ECU, wherein the at least one speed sensor and roll/yaw sensor in communication with the VSC ECU is configured to provide sensor feedback to the VSC ECU.

9. The variable rate bound stopper of claim 8, wherein the VSC ECU is configured to automatically activate the electrical power source as a function of the sensor feedback provided by the at least one wheel speed sensor and roll/yaw sensor in communication with the VSC ECU.

10. The variable rate bound stopper of claim 7, wherein the VSC ECU is configured to activate the electrical power source as a function of a user selection.

11. A shock absorber comprising:
    a cylinder and a piston rod extending from the cylinder;
    a bound stopper comprising an elastomer member positioned onto and disposed around the piston rod; and
    at least two shape memory alloy (SMA) coils extending around at least a portion of the elastomer member, wherein:
    each of the at least two SMA coils comprise a relaxed state and an activated state;
    each of the at least two SMA coils constrain the elastomer member from deforming radially outward when in the activated state;
    an intrinsic spring rate of the bound stopper is altered when the at least two SMA wires are in the activated state;
    wherein the bound stopper has a first spring rate when one of the at least two SMA coils is in the activated state and constrains the elastomer member; and
    the bound stopper has a second spring rate when another of the at least two SMA coils is in the activated state and constrains the elastomer member.

12. The shock absorber of claim 11, further comprising a vehicle stability control (VSC) electronic control unit (ECU) and an electrical power source in communication with each of the at least two SMA coils, the VSC ECU configured to activate the electrical power source and the electrical power source configured to provide an activation electric current to each of the at least two SMA coils when the electrical power source is activated.

13. The shock absorber of claim 12, wherein the VSC ECU and the electrical power source are configured to activate the at least two SMA coils independently from each other.

14. The shock absorber of claim 13, further comprising a plurality of vehicle motion sensors in communication with the VSC ECU, each of the plurality of vehicle motion sensors configured to provide sensor feedback to the VSC ECU.

15. The shock absorber of claim 14, wherein the plurality of vehicle motion sensors are selected from at least one of a wheel speed sensor and a roll/yaw sensor.

16. The shock absorber of claim 14, wherein the VSC ECU is configured to automatically activate at least one of the two SMA coils as a function of sensor feedback provided by at least one of the plurality of vehicle motion sensors in communication with the VSC ECU.

17. The shock absorber of claim 12, wherein the VSC ECU is configured to activate the electrical power source as a function of a user selection.

18. The shock absorber of claim 11, wherein the bound stopper has a third spring rate when two of the at least two SMA coils are in the activated state and constrain the elastomer member.

19. A variable rate vehicle suspension system comprising:
a cylinder and a piston rod extending from the cylinder;
a bound stopper comprising an elastomer member with an aperture, wherein the piston rod extends through the aperture such that the bound stopper is disposed around the piston rod;
at least two shape memory alloy (SMA) coils extending around at least a portion of the elastomer member; and
a vehicle stability control (VSC) electronic control unit (ECU) and an electrical power source in communication with each of the at least two SMA coils, the VSC ECU configured to activate the electrical power source and the electrical power source configured to provide an activation electric current to each of the at least two SMA coils when the electrical power source is activated, wherein:
each of the at least two SMA coils comprise a relaxed state and an activated state;
each of the at least two SMA coils constrain the elastomer member from deforming radially outward when in the activated state;
an intrinsic spring rate of the bound stopper is altered when the at least two SMA wires are in the activated state;
wherein the bound stopper has a first spring rate when one of the at least two SMA coils is in the activated state and constrains the elastomer member; and
the bound stopper has a second spring rate when another of the at least two SMA coils is in the activated state and constrains the elastomer member.

20. The variable rate vehicle suspension system of claim 19, wherein the bound stopper has a third spring rate when two of the at least two SMA coils are in the activated state and constrain the elastomer member.

* * * * *